United States Patent [19]

Nitschké et al.

[11] Patent Number: 5,698,337
[45] Date of Patent: Dec. 16, 1997

[54] PROCESS FOR PREPARING A SEPARATOR PLATE FOR A MELT CARBONATE FUEL CELL AND SEPARATOR PLATE PREPARED ACCORDING TO THIS PROCESS

[75] Inventors: Felix Nitschké, München; Jörg Wind, Karlsfeld; Heinz Huber, Haar, all of Germany

[73] Assignee: Energy Research Corporation, Danbury, Conn.

[21] Appl. No.: 695,860

[22] Filed: Aug. 9, 1996

[30] Foreign Application Priority Data

Aug. 19, 1995 [DE] Germany ............... 195 30 527.2
Nov. 4, 1995 [DE] Germany ............... 195 41 187.0

[51] Int. Cl.$^6$ ............................................. H01M 8/02
[52] U.S. Cl. ............................ 429/35; 429/16; 427/115
[58] Field of Search .......................... 429/16, 35, 34, 429/38, 39; 427/115, 456, 446, 448; 501/127

[56] References Cited

U.S. PATENT DOCUMENTS

| 5,077,148 | 12/1991 | Schora et al. | 429/16 |
| 5,227,256 | 7/1993 | Marianowski et al. | 429/35 X |
| 5,232,792 | 8/1993 | Reznikov | 429/35 X |
| 5,478,663 | 12/1995 | Cipollini et al. | 429/35 |

*Primary Examiner*—Anthony Skapars
*Attorney, Agent, or Firm*—Robin, Blecker, Daley and Driscoll

[57] ABSTRACT

A manufacturing method for a separator plate for a molten carbonate fuel cell and separator plate made by the method. The separator plate comprises Ni-clad stainless steel. Aluminum is brought onto the wet seal area of the separator plate by high-velocity oxygen flame spraying. In addition, an intermetallic phase of the aluminum and the base metal is produced. The base metal can be both stainless steel or nickel.

12 Claims, 2 Drawing Sheets

PROCESS FOR PREPARING A SEPARATOR PLATE FOR A MELT CARBONATE FUEL CELL AND SEPARATOR PLATE PREPARED ACCORDING TO THIS PROCESS

BACKGROUND OF THE INVENTION

The present invention pertains to a process for preparing a separator plate from a stainless steel plate clad with nickel by roll bonding for a molten carbonate fuel cell and to a separator plate prepared according to this process.

Separator plates are prior-art components of fuel cells and are used to separate adjacent cells. They are to prevent a fuel gas, which is located in the space on one side of the respective plate, from mixing with an oxidizing agent, which is located in the space on the other side of the plate. A fuel cell stack of molten carbonate fuel cells, between which separator plates are located, has been known from EP 0 405 088 B1.

The wet seal area of a molten carbonate fuel cell forms the closure of the cell to the outside. The matrix filled with the electrolyte (lithium carbonate and potassium carbonate) is led out up to the bent-over edges of the separator plates of a fuel cell and is connected to same in the wet seal area. As a result, each separator plate has direct contact with the molten salt. Based on the design of the cell stack, both the reducing gases and the oxidizing gases have access at the wet seal area on both sides of the separator plate, which consists of, e.g., a stainless steel plate clad with nickel by roll bonding. The separator plate is therefore exposed in the wet seal area to the corrosive attack of the molten salt in both reducing and oxidizing atmosphere. This leads to the formation of oxide layers, but these layers cannot protect the steel and the nickel from further attacks, because they are not dense. This situation represents an extreme load universe, which the stainless steel plate is unable to withstand and is destroyed by corrosion in a relatively short time. The corrosive attack takes place on a relatively small portion of the surface of the entire separator plate.

The use of steels with high aluminum content for the separator plates is a suitable method for solving the corrosion problem in the wet seal area. The oxide layers formed on their surfaces are dense and stable and protect the base material. However, the oxide layers have very high resistivities, so that the use of such materials for the entire separator plate is ruled out.

To generate a high aluminum concentration in the wet seal area, it would be possible to partially aluminize the separator plates on the steel side. This first seems to be trivial, because perfected methods are available for applying aluminum by means of the various alternative methods and conventional spraying techniques. The above mentioned methods are not suitable for aluminizing separator plates, because they have decisive drawbacks in the case of separator plates. Thus, the aluminization of only a small part of the separator plate, whose size may reach up to 1 square meter, according to the powder pack method or according to similar techniques is not meaningful even for economic reasons. Vacuum-coating methods cannot be considered for use for the same reason, because very large vacuum units would be needed for coating small surfaces. Even though all spraying techniques are suitable, in principle, for applying aluminum, the adhesion of the layers is insufficient without pretreatment of the substrate. Roughening by sandblasting, which is therefore necessary, leads to an intolerable warping of the separator plates. In addition, the porosity of the layers applied according to the prior-art plasma spraying method or by flame spraying with wire is so high that it no longer forms a sufficient protective layer for the stainless steel even after heat treatment. The aluminization of nickel causes considerable difficulties so that the nickel-plated sides of the separator plates can be aluminized only after removal of the nickel. This is a very expensive process.

The basic object of the present invention is to develop an economical process for preparing a corrosion resistant separator plate for a molten carbonate fuel cell, which separator plate has good electrical conductivity, is resistant to corrosion, and consists of a stainless steel plate clad with nickel by roll bonding, and to provide a separator plate which is prepared according to this process and is especially suitable for molten carbonate fuel cells.

SUMMARY OF INVENTION

The task is accomplished according to the present invention concerning the process by partially applying aluminum to the separator plate in the wet seal area by high-velocity oxygen flame spraying and by generating an intermetallic aluminum phase with the carrier metal of the aluminum. It was found that the aluminum layers applied by high-velocity oxygen flame spraying have sufficient adhesive strength because of the high velocity of the particles even without preliminary sandblasting. High-velocity oxygen flame spraying is also suitable for the partial coating of relatively large surfaces, and it generates layers having low porosity and high adhesive strength, which cannot be achieved with other spraying techniques. However, the aluminum layers produced still have a residual porosity, so that they do not yet offer sufficient corrosion protection in themselves. However, sufficient protection is achieved by the formation of a dense intermetallic aluminum phase, wherein the substrate atoms and the aluminum diffuse into each other.

Depending on the side of the separator plate, i.e., the nickel side or the stainless steel side, different methods may be used to generate the intermetallic phase.

In an advantageous embodiment, the nickel on the separator plate is first removed from the wet seal area, and aluminum is then applied to the separator plate in the wet seal area by high-velocity oxygen flame spraying on the cathode side and on the anode side, after which the separator plate is heat treated at high temperature. Complete formation of the intermetallic aluminum phase in the wet seal area is achieved according to this process, so that a crack-free and gap-free protective layer is present.

In another favorable embodiment, the separator plate is coated with aluminum in the wet seal area after removal of the nickel by high-velocity oxygen flame spraying with the spraying tool at a short distance from the surface of the separator plate. The temperature of the substrate increases in this process upon the impact of the aluminum so greatly that a rapid diffusion of the aluminum into the steel of the separator plate takes place already during the spraying process. An intermetallic aluminum layer, which sufficiently protects the steel in the wet seal area from corrosion, is therefore formed already during the coating.

In another advantageous embodiment, the separator plate is installed in a molten carbonate fuel cell after removal of the nickel in the wet seal area after coating with aluminum in the wet seal area by high-velocity oxygen flame spraying, and intermetallic aluminide is generated in situ at the operating temperature during a subsequent run-in phase. A slow interdiffusion of aluminum and steel takes place during the run-in phase at the operating temperature of the fuel cell. It was found that the steel located under the aluminum is protected during the formation of the aluminum phase for a sufficiently long time before an appreciable corrosion develops. The special advantage of the above-described process is that a heat treatment step can be omitted.

The aluminum layers prepared according to the above-described process completely protect the stainless steel areas of the separator plates in the wet seal area. The mechanical properties of the separator plates, such as ductility, can be adapted to the requirements by specifically setting the coating parameters.

When aluminum is applied to nickel in the high-velocity oxygen flame spraying process, it is seen that a certain porosity develops, i.e., the aluminum is too porous to protect the subjacent nickel from corrosion. The removal of the nickel in the wet seal area, i.e., a step of the manufacturing process, can be eliminated if an intermetallic phase is generated between the aluminum sprayed on and the nickel.

The aluminide phase is preferably generated on aluminum applied to the nickel in the wet seal areas by heat treating the separator plate, the aluminum having to be applied to the nickel according to the high-speed flame spraying process. The composition of the intermetallic phase is independent from the amount of the aluminum applied and the annealing time and is constant over the entire thickness of the aluminum layer. The amount of the aluminum applied therefore determines the thickness of the intermetallic phase.

In an especially advantageous embodiment, a mixture of aluminum powder and nickel powder is applied to the nickel in the wet seal area according to the high-velocity oxygen flame spraying process in proportion to the aluminide being formed. If the process parameters and the particle size of the powder are selected properly, an aluminide phase is formed partially or completely during the spraying process. If the aluminide phase is formed only partially, the residual porosity is eliminated by the in situ interdiffusion during the operation of the cell.

In another advantageous embodiment, a mixture of $Ni_xAl_y$ alloy powder and pure aluminum powder is applied to the nickel in the wet seal area according to the high-velocity oxygen flame spraying process. An aluminide phase, whose residual porosity is eliminated in situ, e.g., during the run-in phase of the molten carbonate fuel cell, is thus formed at least partially after the application by spraying.

In another favorable embodiment, $Ni_xAl_y$ alloy powder is applied to the nickel in the wet seal area of the separator plate at least at the decomposition temperature of the nickel alloy according to the high-velocity oxygen flame spraying process. In this process, the alloy undergoes complete or partial decomposition during the coating process. With this process, a heating step may be eliminated, since the composition of the sprayed-on layer corresponds to that of the desired aluminide, which is formed in situ during the run-in phase of the respective fuel cell.

The present invention will be described in greater detail below on the basis of exemplary embodiments shown in the drawings, from which further details, features and advantages will become apparent.

DETAILED DESCRIPTION

Figure 1:
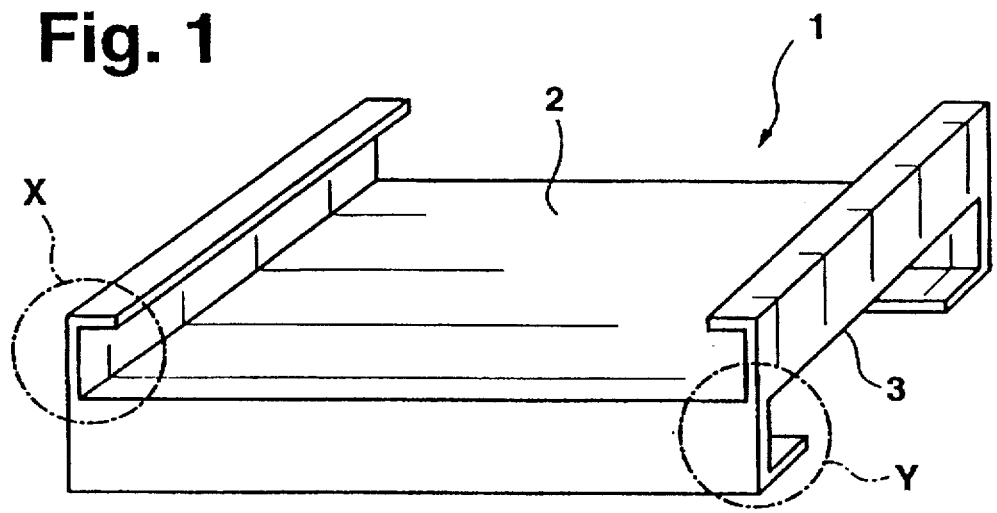
FIG. 1 shows a perspective view of a separator plate for a molten carbonate fuel cell, FIG. 2 schematically shows a longitudinal section of part of a separator plate, which corresponds to the section designated by X in FIG. 1, in a molten carbonate fuel cell, FIG. 3 schematically shows a longitudinal section of part of a separator plate, which corresponds to the section designated by Y in FIG. 1, in a molten carbonate fuel cell, FIG. 4 schematically shows a device for the high-velocity oxygen flame spraying process for a part of a separator plate for molten carbonate fuel cells.

FIG. 1 shows a perspective view of a separator plate 1. The side of the separator plate 1 facing the anode of the molten carbonate fuel cell is designated by 2, and the side facing the cathode is designated by 3. The separator plate 1 contains a stainless steel plate 4, to which nickel 5 is applied by roll bonding. The cross section of this plate is shown in FIGS. 2 and 3.

Figure 2:
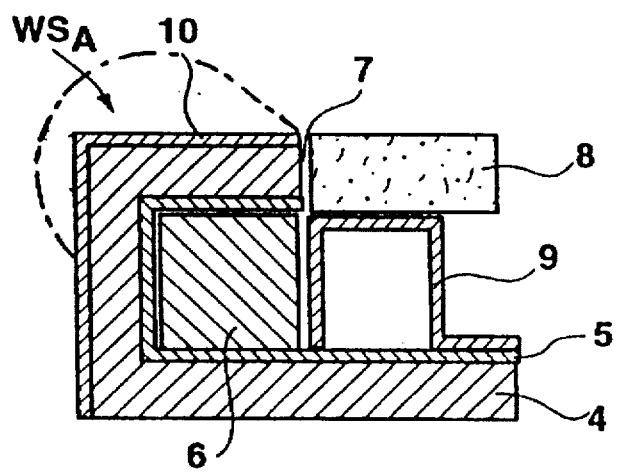

FIG. 2 shows the cross section of a section of the separator plate 1 designated by X in FIG. 1 in the mounted state in a molten carbonate fuel cell. This section X is located in the molten carbonate fuel cell partially in the so-called wet seal area. The part of the separator plate 1 located on the anode side in the wet seal area is designated by WSA in FIG. 2. The outsides of the bent-over section of the separator plate 1 form the wet seal area WSA with the matrix containing the molten carbonate. The zone of the wet seal area WSA is outlined by dash-dotted lines in FIG. 2. The stainless steel plate 4 is bent over twice at right angles at its edge on the anode side 2, as a result of which a hollow space is formed, in which a strip, the so-called hard rail 6, is located. The edge of the anode 8 is located opposite one front side 7 of the stainless steel plate 4. The hard rail 6 determines the distance between the anode 8 and the nickel layer 5, which is located on the side of the separator plate 1 facing the anode 8 or the hard rail 6 and extends to the end of the stainless steel plate 4, i.e., to its front side. The anode current collector 9 is arranged next to the hard rail 6 in the space between the anode 8 and the stainless steel plate 4. A layer 10 consisting of an intermetallic phase of aluminum and the metal located under the layer, especially the stainless steel, is located on the separator plate 1 in the wet seal area WSA. The layer 10 is prepared in a manner to be described in detail below. No such layer needs to be present on the anode side outside the wet seal area WSA. The layer 10 is especially resistant to corrosion.

Figure 3:
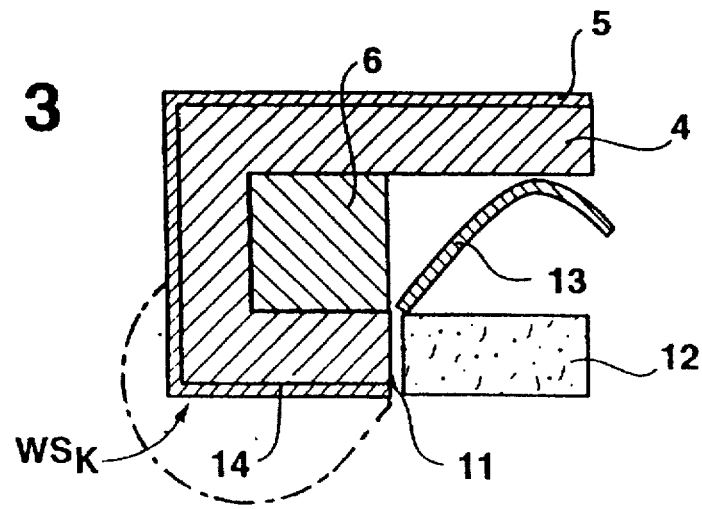

FIG. 3 shows the cross section of the section of the separator plate 1 designated by Y in the mounted state in a molten carbonate fuel cell. This section Y is located partially in the wet seal area in the molten carbonate fuel cell on the cathode side 3. The part of the separator plate 1 located on the cathode side in the wet seal area is designated by WSK in FIG. 3 and is identified by a dash-dotted outline. The stainless steel plate 4 is bent over twice at right angles at its edge on the cathode side 3 to form a hollow space, in which a hard rail 6 is located, as on the anode side. The edge of the cathode 12 is located opposite a second front side 11 of the stainless steel plate 4. There is a certain distance between the cathode 12 and the stainless steel plate 4 due to the thickness of the hard rail 6. The nickel layer 5 is located on the side of the stainless steel plate 4 facing away from the cathode 12. The cathode current collector 13 is arranged in the hollow space between the stainless steel plate 4 and the cathode 12. A layer 14 consisting of an intermetallic phase of aluminum and the metal located under the layer, which is stainless steel according to FIG. 3, is located on the separator plate 1 in the wet seal area WSK. This layer 14 is especially resistant to corrosion. The nickel layer is removed in the wet seal area WSK in the separator plate shown in FIG. 3, so that the intermetallic phase can be prepared from an aluminum layer applied in the manner described below.

Figure 4:
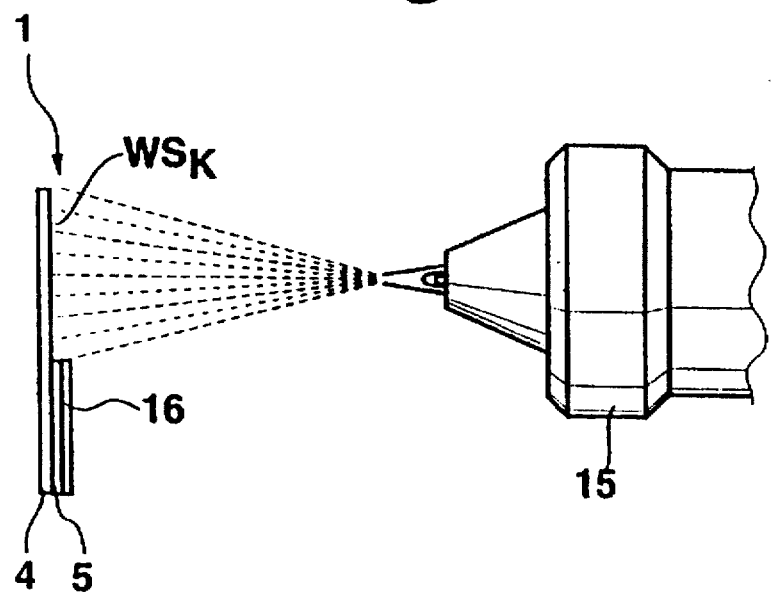

FIG. 4 shows the coating of the wet seal area WSK of the separator plate 1 on the cathode side 3 with aluminum powder according to the high-velocity oxygen flame spraying process. Only the spray gun 15 of the flame-spraying device with its front part is shown in FIG. 4. The aluminum is flung onto the stainless steel surface in the molten or extensively plastic state under high pressure. Since only part of the separator plate 1, namely, the part that corresponds to the wet seal area WSK or WSA, is coated, the rest of the separator plate 1 is provided with a cover 16. The separator plate 1 must be coated in the wet seal area WSA and WSK. The nickel is removed from the nickel side of the separator plate 1 in this area, so that only the stainless steel plate is left. The section on the anode side without nickel is coated in the same manner as the other section after removal of the nickel. A gun of the type of Diamond Jet from the firm of Sulzer Metco may be used as the spray gun 16. The flow rate of aluminum powder is, e.g., between 10 g/minute and 50 g/minute. The nozzle of the spray gun is preferably located at a distance of 180 mm to 220 mm from the surface of the separator plate.

Figure 5:
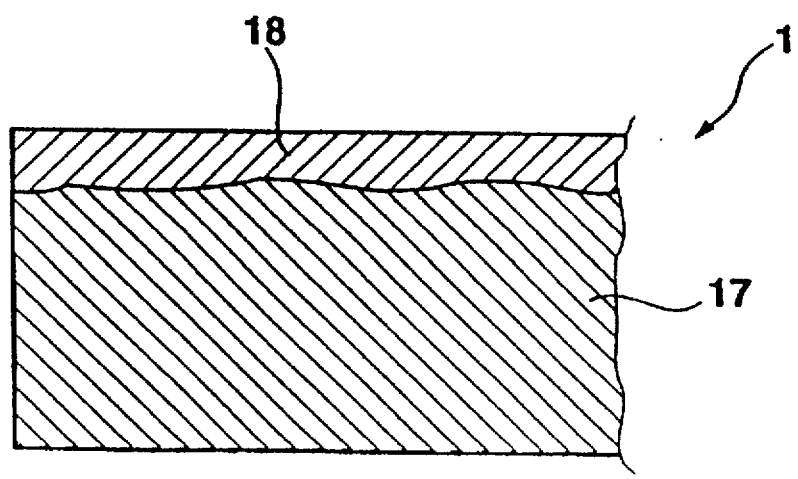
FIG. 5 shows a cross section of part of a separator plate for molten carbonate fuel cells with an intermetallic phase between aluminum and a carrier metal.

After the separator plate 1 in the wet seal area WSA and WSK has been coated with aluminum, the separator plate 1 is heat treated in another process step. The heat treatment may be limited to the wet seal area, which accounts for a small part of the separator plate 1 only, so that the separator plate 1 is not warped by the heat treatment. The heat treatment time is about 3 minutes to 60 minutes. An intermetallic phase is formed between the stainless steel and aluminum due to the heat treatment at temperatures of 700° C. to 900° C., i.e., aluminide is formed. The surface of the separator plate in the wet seal area is protected as a result from corrosion caused by the molten carbonate electrolyte. The longitudinal section of part of the separator plate 1 with a core 17 consisting of stainless steel and a layer 18 of intermetallic phase consisting of aluminum and steel is shown in FIG. 5. A separate heat treatment phase can be eliminated if the intermediate phase is generated in situ in the cell stack during the run-in phase after the installation of the separator plate 1. The distance between the nozzle of the spray gun 15 and the separator plate 1 may be reduced to about 140 mm to 180 mm during the high-velocity oxygen flame spraying, as a result of which the substrate, i.e., the stainless steel plate, is heated so intensely during the impact of the aluminum particles that the intermetallic phase is formed between steel and aluminum. A separate heat treatment phase both before and after the installation of the separator plate can thus be eliminated.

The above-described coating of the separator plate 1 requires the removal of the nickel layer. It is, however, possible to deposit aluminum on the nickel by high-velocity oxygen flame spraying. An aluminum layer of a thickness of, e.g., 30 µm to 100 µm is deposited. It is favorable to apply the aluminum layers first to the stainless steel side and the nickel side of the separator plate 1 and subsequently to form an intermetallic phase between the deposited aluminum on both the stainless steel side and the nickel side of the separator plate 1 by heat treatment. The amount of aluminum applied and the annealing time, which is preferably between 5 minutes and 60 minutes, determine the thickness of the layer of the intermetallic phase.

According to another method for coating and forming the intermetallic phase, a mixture of aluminum powder and nickel powder is applied to the nickel side of the separator plate 1 according to the high-velocity oxygen flame spraying process. The ratio of nickel to aluminum powder may be 50 wt. % at equal particle size. The distance between the nozzle of the spray gun and the nickel side of the separator plate is about 180 mm. An intermetallic phase is thus formed on the nickel side already during the coating due to the interdiffusion of aluminum and nickel, and this intermetallic phase is reinforced in situ after .the installation of the separator plate in the cell stack, and it protects the separator plate from corrosion in the wet seal area.

According to another process for coating the wet seal area of the nickel side and for forming the intermetallic phase, a mixture of $Ni_xAl_y$ alloy powder and pure aluminum is deposited by high-velocity oxygen flame spraying. The ratio of the $Ni_xAl_y$ alloy to aluminum may be 50–90 wt. %. An aluminide phase is partially formed during the application of the mixture to the nickel, and the residual porosity of this aluminide phase is eliminated in situ by the formation of the intermetallic phase at the operating temperature of the cell, e.g., during the run-in phase after the installation of the separator plate 1 in the cell stack.

It is especially favorable for the mixture to be applied to the nickel side of the separator plate at the decomposition temperature of the nickel alloy. A temperature of about 1,000–1,600 degrees Celsius is suitable for this. The $Ni_xAl_y$ alloy is decomposed due to this high temperature during the coating process, as a result of which a mixture of pure Al and Ni as well as of an intermetallic phase is obtained, which [mixture]is completed in situ after the installation of the separator plate in the cell stack such that the separator plate will also be protected from corrosion on the nickel side.

The above-described process may be used to prepare separator plates which are protected from corrosion in the wet seal area and have good electrical conductivity in the rest of the area. The intermetallic phase between the aluminum and the metal located under it, e.g., stainless steel or nickel, may also extend by a certain amount beyond the wet seal area occurring during the operation of the fuel cell, as a result of which tolerances are taken into account during installation.

What is claimed is:

1. Process for preparing a separator plate for a molten carbonate fuel cell from a stainless steel plate clad with nickel, characterized in that aluminum is applied partially to the separator plate (1) in a wet seal area (WSA, WSK) by high-velocity oxygen flame spraying, and that an intermetallic phase is formed with the carrier metal on which the aluminum is applied.

2. Process in accordance with claim 1, characterized in that the nickel is first removed from the separator plate in the wet seal area, and that aluminum is then applied to the said separator plate (1) in the wet seal area (WSA, WSK ) on both sides by high-velocity oxygen flame spraying.

3. Process in accordance with claim 1, characterized in that the intermetallic phase is formed by heat treating after coating the wet seal area (WSA, WSK) of the said separator plate (1) with aluminum.

4. Process in accordance with claim 2, characterized in that the surface of the said separator plate (1) in the wet seal area (WSA, WSK) is coated with aluminum by high-velocity oxygen flame spraying at a short distance from the spraying head.

5. Process in accordance with claim 2, characterized in that an intermetallic phase is formed in the separator plate coated with aluminum in the wet seal area during the run-in phase after installation in a fuel cell.

6. Process in accordance with claim 1, characterized in that aluminum is deposited on the nickel by high-velocity oxygen flame spraying, and that an intermetallic phase is then formed between the nickel and aluminum.

7. Process in accordance with claim 6, characterized in that the intermetallic phase between aluminum and nickel is formed by heat treating the separator plate in the wet seal area.

8. Process in accordance with claim 1, characterized in that a mixture of aluminum powder and nickel powder is deposited in a desired ratio on the nickel in the wet seal area by high-velocity oxygen flame spraying.

9. Process in accordance with claim 1, characterized in that a mixture of $Ni_xAl_y$ alloy powder and aluminum powder is deposited on the nickel in the wet seal area by high-velocity oxygen flame spraying, and that the separator plate is then installed in a cell stack, and the intermetallic phase between the aluminum and nickel is completed in situ during the run-in phase.

10. Process in accordance with claim 1, characterized in that a mixture of $Ni_xAl_y$ alloy powder is applied to the nickel in the wet seal area by high-velocity oxygen flame spraying at the decomposition temperature of the nickel alloy.

11. Separator plate for a molten carbonate fuel cell with a stainless steel plate, to which nickel is attached on one side, characterized in that the nickel is removed from the stainless steel in the wet seal area (WSA, WSK), and that at least one intermetallic phase between steel and aluminum is present on the said separator plate (1) in the wet seal area (WSA, WSK).

12. Separator plate for a molten carbonate fuel cell with a stainless steel plate, to which nickel is attached on one side, characterized in that an intermetallic phase between the stainless steel and aluminum is present on the stainless steel in the wet seal area (WSA, WSK) of the said separator plate (1), and an intermetallic phase between nickel and aluminum is present on the nickel.

\* \* \* \* \*

UNITED STATES PATENT AND TRADEMARK OFFICE
CERTIFICATE OF CORRECTION

PATENT NO. : 5,698,337
DATED : December 16, 1997
INVENTOR(S) : Nitschke' et al.

It is certified that error appears in the above-indentified patent and that said Letters Patent is hereby corrected as shown below:

Col. 4, line 20, delete "So-called" and insert -- so-called --.

Signed and Sealed this

Twenty-first Day of July, 1998

Attest:

BRUCE LEHMAN

*Attesting Officer*    *Commissioner of Patents and Trademarks*